(12) United States Patent
Shetty et al.

(10) Patent No.: US 7,996,690 B2
(45) Date of Patent: Aug. 9, 2011

(54) SYSTEM AND METHOD FOR DYNAMIC UTILIZATION-BASED POWER ALLOCATION IN A MODULAR INFORMATION HANDLING SYSTEM

(75) Inventors: Sudhir Shetty, Cedar Park, TX (US); Ashish Munjal, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 833 days.

(21) Appl. No.: 12/018,853

(22) Filed: Jan. 24, 2008

(65) Prior Publication Data

US 2009/0193276 A1 Jul. 30, 2009

(51) Int. Cl.
*G06F 1/18* (2006.01)
*G06F 1/26* (2006.01)

(52) U.S. Cl. .................. 713/300; 713/320; 713/340

(58) Field of Classification Search ........... 713/300–340
See application file for complete search history.

(56) References Cited

U.S. PATENT DOCUMENTS

| | | | |
|---|---|---|---|
| 6,901,521 B2 * | 5/2005 | Chauvel et al. ............... | 713/300 |
| 6,986,069 B2 * | 1/2006 | Oehler et al. ................. | 713/320 |
| 7,043,647 B2 * | 5/2006 | Hansen et al. ................ | 713/320 |
| 7,043,650 B2 * | 5/2006 | Bresniker et al. ............. | 713/324 |
| 7,051,215 B2 | 5/2006 | Zimmer | |
| 7,155,622 B2 * | 12/2006 | Mancey et al. ............... | 713/324 |
| 7,213,065 B2 | 5/2007 | Watt | |
| 7,424,624 B2 * | 9/2008 | Espinoza-Ibarra et al. ... | 713/300 |
| 7,581,125 B2 * | 8/2009 | Ranganathan et al. ....... | 713/320 |
| 7,793,120 B2 * | 9/2010 | McGrane et al. ............. | 713/300 |
| 7,793,126 B2 * | 9/2010 | McGrane et al. ............. | 713/320 |
| 7,802,017 B2 * | 9/2010 | Uemura et al. ............... | 709/250 |
| 2002/0007463 A1 * | 1/2002 | Fung ............................. | 713/320 |
| 2003/0037150 A1 * | 2/2003 | Nakagawa .................... | 709/229 |
| 2004/0230848 A1 * | 11/2004 | Mayo et al. ................... | 713/320 |
| 2005/0034000 A1 * | 2/2005 | Lee ............................... | 713/320 |
| 2006/0230299 A1 * | 10/2006 | Zaretsky et al. ............. | 713/320 |

* cited by examiner

*Primary Examiner* — Mark Rinehart
*Assistant Examiner* — Trisha Vu
(74) *Attorney, Agent, or Firm* — Hamilton & Terrile, LLP; Robert W. Holland

(57) ABSTRACT

Power from a modular chassis to plural modular information handling systems contained by the chassis is dynamically allocated according to power consumed at each modular information handling system and a priority associated with each modular information handling system. A power manager of the modular chassis allocates power by setting a maximum power for each modular information handling system based upon a priority for each modular information handling system. A power monitor on a modular information handling system requests additional power allocation if power consumed is within a predetermined amount of the maximum power for that system. The power manager allocates additional power in response to the request if another modular information handling system has excess power allocated or if the requesting modular information handling system has a higher priority than another modular information handling system. The requesting system's maximum power is increased and the other system maximum power is decreased so that the maximum power available from the chassis is not exceeded.

17 Claims, 2 Drawing Sheets

SYSTEM AND METHOD FOR DYNAMIC UTILIZATION-BASED POWER ALLOCATION IN A MODULAR INFORMATION HANDLING SYSTEM

BACKGROUND OF THE INVENTION

1. Field of the Invention

The present invention relates in general to the field of information handling system power allocation, and more particularly to a system and method for dynamic utilization-based power allocation in a modular information handling system.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Business enterprises often rely on a number of information handling systems to perform information processing for enterprise functions. In order to save space and reduce cost, enterprises sometimes use information handling systems deployed in a modular configuration. For example, a chassis has multiple slots with each slot configured to accept an information handling system module. Each module typically has one or more processors, memory and firmware to run an operating system and desired applications; however, power and cooling for the modules is typically provided by resources within the chassis which are distributed to the modules. One example of such a modular configuration is a blade information handling system which has a chassis having slots to accept plural blade modules. A chassis management controller associated with the chassis has firmware and processing resources to manage the distribution of power resources to the various blade modules. A blade module controller associated with each blade module manages the operation of each blade within constraints set by the chassis management controller. An advantage to modular information handling system configurations, such as blade systems, is that an enterprise can add processing resources as needed by adding blade modules to the blade chassis. By sharing power and cooling resources through a common chassis, overall cost is reduced.

One difficulty that arises with modular information handling system configurations is that the chassis power system is typically not capable of operating an information handling system module in each chassis slot at maximum power consumption level. To address this difficulty, the chassis management controller power management firmware typically manages a power budget for each information handling system module to balance power allocation based on power requirements and priority. Total available power from the chassis power supply is allocated based upon a worst case sustained power need ($power_{max}$) and worst case throttled power requirements ($power_{min}$) determined by the blade module controllers. The information handling system module power requirements are used in combination with user-configurable module priorities to determine the power allocation for each module. Thus, if available power is restricted then information handling system modules having more critical functions are allocated adequate power to operate unthrottled while other modules having less critical functions operate in throttled modes. However, the information handling system modules that have maximum power available typically do not use maximum power for extended simultaneous time periods. Thus, allocated but unutilized power typically remains available from the power supply but unavailable for use by all of the information handling system modules. As a result, some information handling system modules run in throttled modes even though the chassis power supply has additional power available to operate the information handling system modules unthrottled at least some of the time.

SUMMARY OF THE INVENTION

Therefore a need has arisen for a system and method which provides dynamic utilization-based power allocation in a modular information handling system.

In accordance with the present invention, a system and method are provided which substantially reduce the disadvantages and problems associated with previous methods and systems for allocation of power between information handling system modules of a modular information handling system. Power from a chassis power supply that is allocated to priority information handling system modules but not used by those modules is selectively and dynamically re-allocated to lower priority information handling system modules to support more complete utilization of the lower priority information handling system modules without impact to the operation of higher priority information handling system modules.

More specifically, a modular information handling system has a chassis with plural slots and with plural information handling system modules populating at least some of the slots. A power manager associated with the chassis allocates a maximum power to the modules based on the available power, the priority of the modules and the power consumption at the modules. A power monitor at each information handling system module monitors power consumption at the associated module to keep power consumption below the maximum power allocated by the power manager. If additional power is needed at a module, the associated power monitor requests the power from the chassis power manager. The power manager first dynamically allocates power that is available at the power supply and not allocated to other modules. The power manager then identifies power allocated to modules that is not in use by the modules for reallocation to the requesting module. In the event that the requesting information handling system module has a higher priority than other modules, a lower priority module is throttled to create additional power for allocation to the requesting module. In this way, higher priority information handling system modules operate with their power needs met while lower priority modules operate at improved power consumption levels by allocating excess power from the higher priority modules when those modules do not need all of the power that they could otherwise use.

The present invention provides a number of important technical advantages. One example of an important technical advantage is that allocated but unused power from a chassis power supply is dynamically re-allocated so that information handling system modules in the chassis have available a greater portion of the power supply's capacity. Information handling system modules having greater power allocations due to higher priority functions release increments of their power allocations as their power consumption allows so that other information handling system modules having lower priority functions will have additional power available. Re-allocation of power dynamically between modules improves the processing capacity of the modules without impacting higher priority functions since the modules having higher priority functions reacquires power allocations as warranted by power consumption at the modules.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Dynamic allocation of power between information handling system modules of a modular information handling system protects priority systems from throttling while supporting more full utilization of systems having lower priority. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
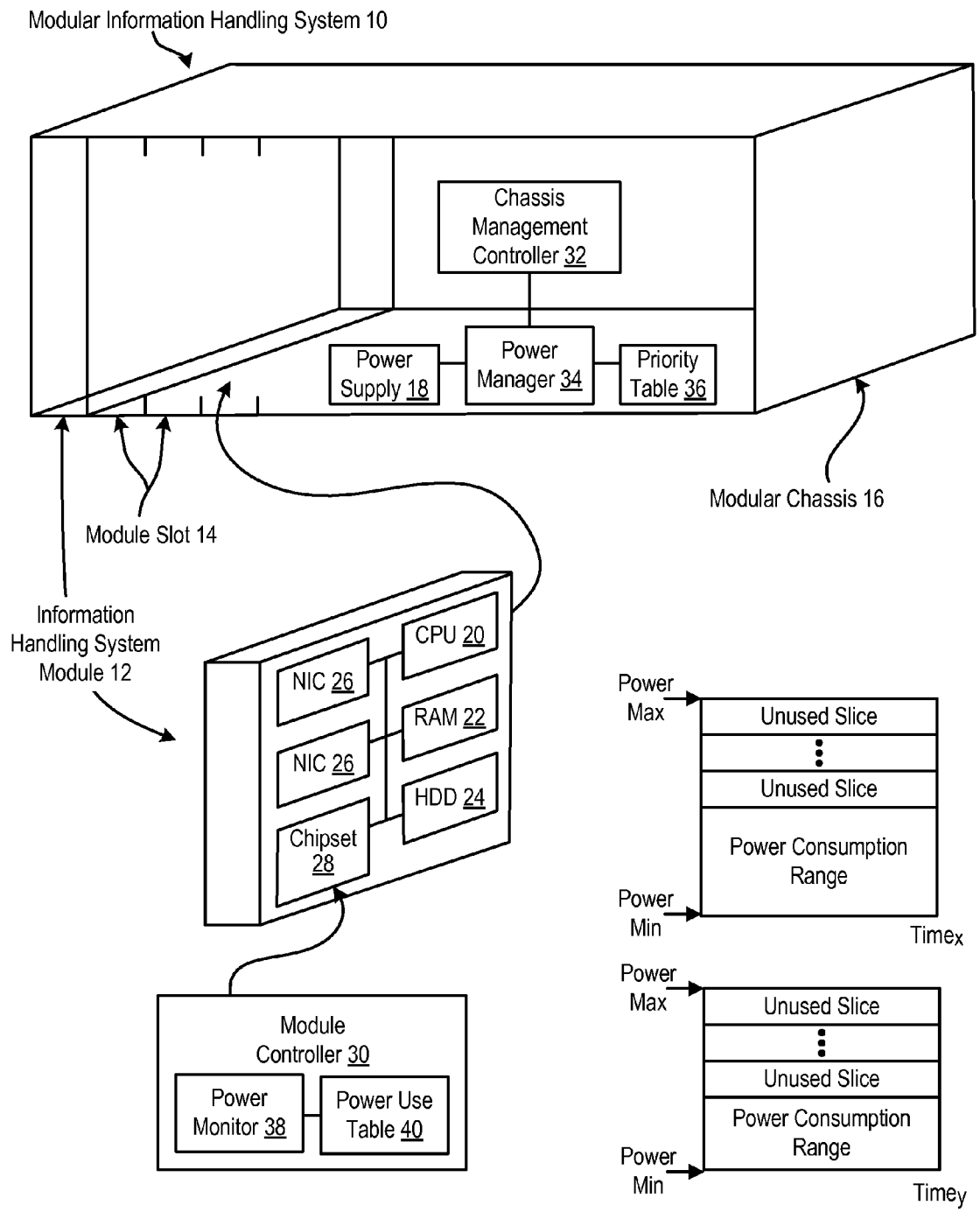
FIG. 1 depicts a block diagram of a modular information handling system having dynamic power allocation between information handling system modules.

Referring now to FIG. 1, a block diagram depicts a modular information handling system 10 having dynamic power allocation between information handling system modules 12. Information handling system modules 12 couple into slots 14 of a modular chassis 16 to receive power from a power supply 18. Power supply 18 may comprise a plurality of power supplies that each provide power when operational so that the total available power depends upon the number of operational power supplies. Each information handling system module 12 includes a number of processing components that cooperate to process information, such as a CPU 20, RAM 22, a hard disk drive 24, a network interface card 26 and a chipset 28. Chipset 28 includes a module controller 30, such as a baseboard management controller which provides out-of-band management of its associated information handling system module 12, such as remote start-up and shut down of module 12. Module controllers 30 interface with a chassis management controller 32, which controls the operation of information handling system modules 12, including the power made available to each information handling system module 12 by a power manager 34. As information handling system modules 12 request power up, power manager 34 ensures that adequate power exists from power supply 18 to run the modules and assigns a maximum power for each module to use. For example, power manager 34 adjusts power available to modules based on the number of power supplies that are operational. If adequate power does not exist to power up a module 12, power manager 34 references a priority table 36 in order to allocate power to the information handling system modules 12 having higher priorities by throttling or shutting down modules having lower priorities.

Power manager 34 applies the available power from power supply 18 and the priorities of priority table 36 to establish a maximum power for each information handling system module 12 and communicates the maximum power to each module controller 30. The maximum power is set so that, if each information handling system module 12 operates at its assigned maximum power, then the total power drawn from power supply 18 will not exceed the capacity of power supply 18. A power monitor 38 associated with each information handling system module 12 monitors power consumption by its associated module 12 to ensure that the maximum power allocated by power manager 34 is not exceeded. In addition, power monitor 38 tracks historical power consumption ranges for its associated information handling system module 12 in a power use table 40. For example, the average power consumption range during time x is a greater portion of the allocated maximum power than is the average power consumption range during time y. Power use table 40 includes other information, such as user-configurable time periods for monitored power use (e.g. 15 minutes), maximum monitored power consumption in that time period (e.g. 300 W), and the number of available slices of power (e.g. 10 slices of 10 Watts=100 W). For example, with a power budget set at 400 W, 300 W of consumption leaves 100 W of available power giving ten 10 W slices to allocate to other blade modules (Power Budget−Max Consumption=Number of available slices of power). At an initial power up request, a power monitor 34 of an information handling system module 12 looks up the historical power consumption range for the current time period from power use table 40 and requests a power allocation from power manager 34 that will support operations within that power consumption range, such as a power allocation having a maximum power of a predetermined amount over the maximum used in the power consumption range. If adequate power is available from power supply 18, power manager 34 allocates the requested maximum power. If adequate power is not available, such as due to other allocations to other information handling system modules, then power manager 34 determines the maximum power to allocate based on the priority of the information handling system module 12, as is explained in greater depth below.

During operation of plural information handling system modules 12, power manager 34 and power monitors 38 coordinate dynamic allocation of power to information handling system modules 12 base on priority and power use. If a power monitor 38 detects an increased power consumption at a module 12, such as a power consumption within a predetermined amount of the maximum power allocated to that module, then the power monitor 38 communicates a request to power manager 34 for an additional power allocation. Power manager 34 attempts to secure an additional power allocation in response to the request by identifying an information handling system module 12 that has an excess power allocation, such as a maximum power allocation that is a predetermined amount over actual power consumption by that module. If power manager 34 identifies such an excess power allocation, then incremental unused slices of power are allocated from the module 12 having excess power allocation to the module 12 requesting an additional power allocation. If power manager 34 cannot identify a module 12 having an excess power allocation, then power manager 34 compares the priority of the requesting module 12 with the other modules 12 to determine if another module should be throttled to provide excess power for the requesting module 12. If throttling is commanded due to the higher priority of the requesting module 12, then, after throttling provides excess power allocation at a throttled module 12, the excess power allocation is re-allocated to the requesting module 12.

Figure 2:
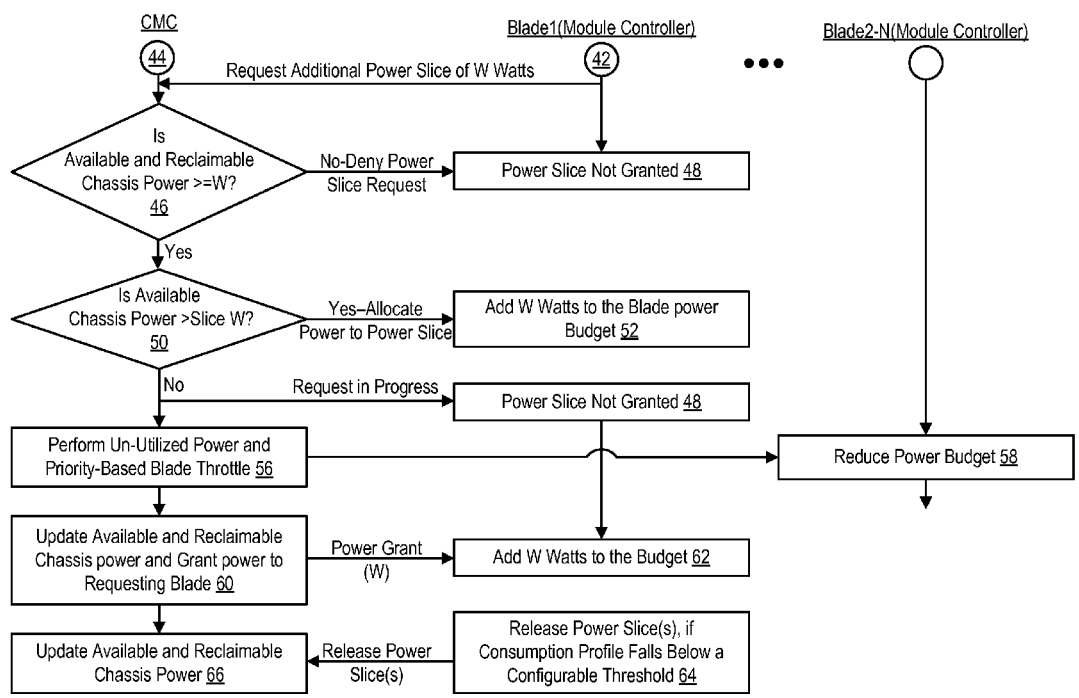
FIG. 2 depicts a flow diagram of a process for dynamic power allocation between information handling system modules.

Referring now to FIG. 2, a flow diagram depicts a process for dynamic power allocation between information handling system modules, such as between blades of a blade information handling system. The process begins at step 42 with a request by a blade module for an additional power allocation of W Watts for its maximum power allowance. At step 44, the chassis management controller receives the request and, at step 46, determines if adequate power is available to meet the request for W Watts. For example, reclaimable power is the power that can be reclaimed from other blade modules by performing throttling operations via the management controller. If at step 46 adequate power to meet the request is not available, the process continues to step 48 to deny the request. If at step 46 adequate power is available to meet the request, the process continues to step 50 to determine if the re-allocation of maximum power settings for each module should occur. At step 50, if the power available from the chassis power supply is greater than the power W requested by the blade module, the process continues to step 52 to reallocate power to the requesting blade module without adjusting other blade modules. If available power is less than the power requested by the blade module, the process continues to step 54 to communicate that the request is pending to the requesting blade module. At step 56, unutilized power and priority-based blade module throttling are performed to free up power for re-allocation in response to the power request. At step 58, the power budget, meaning the available power consumption range, for another blade module is reduced by a predetermined increment. At step 60, the power available for allocation to blade modules is updated and the requesting blade module is granted the additional power. At step 62, the re-allocated power is added to the power budget of the requesting blade module to increase that modules maximum allowed power consumption. At step 64, the re-allocated power is released from the requesting blade module should the power consumption be reduced at that module so that, at step 66, the available and reclaimable chassis power is updated to address future power requests as needed. The requesting blade relinquishes user-configurable slices of power and monitors the peak consumption (MAX) in the last user-configurable time-period. For instance, the requesting blade is monitoring historical power consumption over the last 15 minutes. For example, if the max consumption in that time period is 200 Watts and the budget allocated is 300 Watts a difference of 100 Watts is available for allocation in incremental slices of 10 slices of 10 W. The modular information system may, as an example, relinquish 3 of those 10 slices to the chassis management controller.

Although the present invention has been described in detail, it should be understood that various changes, substitutions and alterations can be made hereto without departing from the spirit and scope of the invention as defined by the appended claims.

What is claimed is:

1. An information handling system comprising:
   a chassis having plural slots, each slot operable to accept an information handling system module;
   plural information handling system modules, each information handling system module having processing components operable to process information and sized to couple to the chassis in a slot;
   a power supply associated with the chassis and operable to selectively allocate power to each slot for use by the information handling system modules;
   a power monitor associated with each information handling system module and operable to monitor power consumption at the associated information handling system module;
   a power manager associated with the chassis and interfaced with the power supply and the power monitors, the power manager operable to dynamically allocate power from the power supply for use by the information handling system modules based upon power consumption monitored by the power monitor of each information handling system module; and
   a power use table associated with each power monitor, the power use table having plural power consumption ranges, each power consumption range associated with a predetermined time period, the power monitor communicating the power consumption range to the power manager to establish initial power allocation for the associated time period.

2. The information handling system of claim 1 wherein the power manager dynamically allocates power by selectively increasing the maximum power allocation to a first of the information handling system modules and selectively decreasing the maximum power allocation to a second of the information handling system modules.

3. The information handling system of claim 2 further comprising a priority table interfaced with the power manager, the priority table having a power allocation priority for the information handling system modules.

4. The information handling system of claim 3 wherein the first of the information handling system modules has a lower priority than the second of the information handling system modules.

5. The information handling system of claim 3 wherein the power manager dynamically allocates power by decreasing the maximum power of the first information handling system module upon detection of increased power consumption at the second information handling system module.

6. The information handling system of claim 1 wherein the power monitor is further operable to populate the power use table by monitoring power consumption ranges at the associated information handling system module.

7. The information handling system of claim 1 wherein the power manager dynamically allocates power by allocating increments of power from information handling system modules having a maximum power allocation of a predetermined amount greater than a monitored power consumption.

8. A method for allocating power between plural information handling system modules of a modular information handling system, the method comprising:
- establishing an initial power allocation having a maximum power for each modular information handling system;
- requesting at a first of the modular information handling systems a power consumption in excess of the power allocation maximum power for the first modular information handling system;
- identifying a second of the modular information handling systems having a power consumption of at least a predetermined amount less than the power allocation maximum power for the second modular information handling system; and
- re-allocating power to increase the maximum power of the first modular information handling system and to decrease the maximum power of the second modular information handling system; and
- requesting by the second modular information handling system a power consumption in excess of the maximum power for the second modular information handling system;
- detecting a higher priority associated with the second modular information handling system than with the first modular information handling system; and
- re-allocating power from the first modular information handling system to the second modular information handling system by throttling the first modular information handling system to reduce its power consumption.

9. The method of claim 8 wherein re-allocating power further comprises incrementally increasing a power budget associated with the first modular information handling system while incrementally decreasing a power budget associated with the second modular information handling system.

10. The method of claim 8 wherein establishing an initial power allocation further comprises:
- monitoring power consumption at the modular information handling systems to define a typical power consumption range for each modular information handling system; and
- allocating power to each modular information handling system according to the typical power consumption range and a priority for each modular information handling system.

11. The method of claim 8 wherein monitoring power consumption further comprises defining the typical power consumption ranges for a time period.

12. The method of claim 8 wherein re-allocating power is performed by a chassis management controller associated with a chassis that contains the first and second modular information handling systems.

13. The method of claim 8 wherein requesting at a first of the modular information handling systems a power consumption in excess of the power allocation maximum power for the first modular information handling system is performed by a module controller associated with the first modular information handling system.

14. A system for allocating power between modular information handling systems disposed in a modular information handling system chassis, the system comprising:
- a power monitor associated with each modular information handling system and operable to monitor power consumed at the associated modular information handling system compared with a maximum power allocated to the associated modular information handling system; and
- a power manager associated with the modular information handling system chassis and interfaced with each modular information handling system, the power manager operable to dynamically allocate power between the modular information handling systems by increasing a maximum power allocated with a first modular information handling system while decreasing a maximum power allocated with a second modular information handling system, the decreasing maximum power including throttling the second information handling system to decrease power consumption below the new maximum power.

15. The system of claim 14 wherein the power manager dynamically allocates power between the modular information handling systems by incrementally increasing and decreasing the maximum power for at least the first and second modular information handling systems.

16. The system of claim 14 wherein the power manager is further operable to initiate allocation of power to the modular information handling systems by retrieving a typical maximum power from each modular information handling system and applying the typical maximum power to a priority associated with each modular information handling system.

17. The system of claim 14 wherein the power monitor is further operable to request an increased maximum power from the power manager if the power consumed at the modular information handling system associated with the power monitor is within a predetermined amount of the maximum power.

* * * * *